UNITED STATES PATENT OFFICE 2,384,190

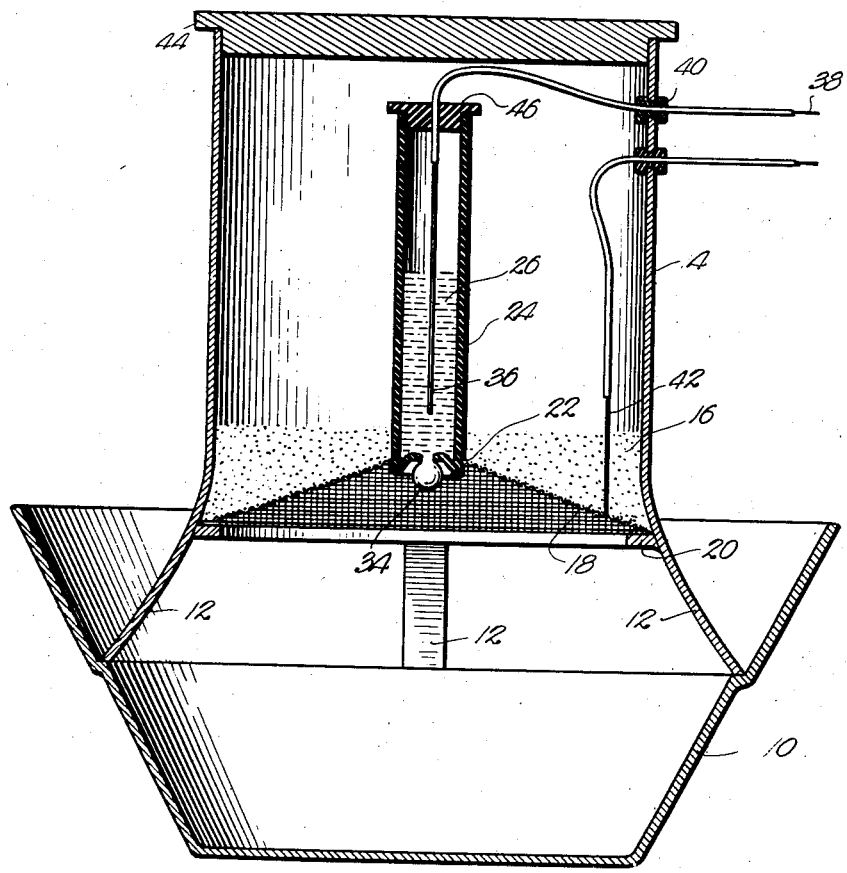
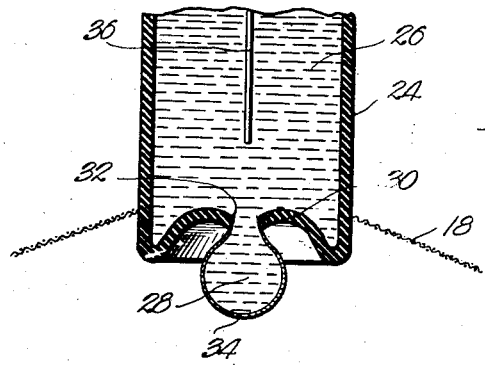

INSECT ATTRACTOR AND DESTROYER

Milo F. Miller, Kansas City, Mo.

Application August 28, 1944, Serial No. 551,545

5 Claims. (Cl. 43—112)

This invention relates to insect attractor and destroyer of the portable type that is characterized by its capacity to positively kill the insect regardless of the type of destructive medium necessary to take the life of the insect that enters the device.

One of the important aims of this invention is to provide an effective and efficient insect destroyer having as a part of its structure means for attracting the insect that serves as one of the elements of destruction, if the animal is of the kind requiring an electric charge to kill the same.

A still further aim of this invention is the provision of means for attracting and destroying insects that has as a part thereof unique electro-chemical elements, the combined action whereof will positively destroy an insect whether it be necessary to apply a powdered insecticide to the legs of the insect, or pass an electric current through the body, if the same is large enough or of the kind that overcomes the effects of the powdered material.

Other aims of the invention will appear during the course of the following specification, referring to the accompanying drawing, wherein:

Fig. 1 is a vertical central sectional view through an attractor and destroyer made in accordance with the present invention; and Fig. 2 is an enlarged fragmentary detailed sectional view through a portion of the foraminous bottom of the device, illustrating the manner in which a globule of attracting substance is formed.

In practical use, it is desirable to mount the attractor and destroyer above a tray 10, through the medium of a plurality of legs 12 which depend from a substantially annular side wall 14 made of sheet material or such substance as will conveniently hold a quantity of powdered insecticide 16.

A bottom member 18 of foraminous material and conical shape, as clearly illustrated in Fig. 1, is supported and held in place within receptacle 14 by an internal flange 20 or by any other similar mechanical expedient. The bottom member 18 extends upwardly and inwardly into receptacle 14 to terminate at a point on the axis thereof. A hole 22 formed in the apex of the conical foraminous bottom member 18 permits reception of the lower end of a container 24. The container is formed of insulating material and is preferably tubular in shape to receive a quantity of liquid 26 having the property of coagulating.

The tubular container 24 is provided with an upwardly inclined concave bottom portion 30 which is provided with a relatively small opening 32 formed at the innermost point on bottom 30, is large enough to permit globule 28 to be formed yet small enough to preclude free flowing of liquid 26 from container 24. This globule 28 is pendulous and hangs below the concave bottom end 30 of container 24, as illustrated in Fig. 2.

Liquid 26 is coagulable and may be a sugar solution having the characteristic of hardening when globule 28 is formed. A hardening coating 34 is established when globule 28 is exposed to the air and as liquid 26 slowly escapes through opening 32.

An electrode 36 suspended within container 24 is submerged in liquid 26 and joined to a source of current (not here shown) by a conductor 38. This conductor 38 is insulated completely from receptacle 14 through the employment of a grommet 40.

Foraminous bottom 18 is joined to conductor 42 which likewise extends to a source of current that is preferably of low voltage and high amperage. Suitable closures 44 and 46 for receptacle 14 and container 24 respectively, are removably associated with these elements.

In operation, the insect to be destroyed is attracted by the material from which globule 28 is formed. This attraction will cause the animal to crawl or fly into tray 10 and thence to the lower side of foraminous material 18 and thereby powdered insecticide 16 is collected on its legs and under-surface. Most objectionable insects are killed by the application of powdered insecticide to the legs, and therefore, the act of collecting the material 16 should serve to destroy the insect, which will fall into tray 10.

If the insect is not affected by the powdered insecticide 16, and if it is large enough to resist the effects thereof, it will move to globule 28 and there proceed to eat its way through the very thin coating 34 where it will come into contact with liquid 26. So doing, will complete a circuit between electrode 36 through liquid 26 to the metallic, foraminous screened bottom 18 to conductor 42. The insect will thus electrocuted and drop into collecting tray 10.

Having thus described the invention, what is claimed as new and desired to be secured by Letters Patent is:

1. An insect attractor and destroyer comprising in combination, a receptacle for powdered insecticide provided with a substantially conical, foraminous bottom extending upwardly thereinto from its side walls; and a container in the receptacle having a portion thereof extending through the foraminous bottom, said container having a coagulable insect attracting liquid therein, the portion of the container extending through said foraminous bottom having an opening therein of a size to permit formation of a globule of the attracting liquid on the exterior of the container without the liquid flowing therefrom.

2. An insect attractor and destroyer comprising in combination, a receptacle for powdered insecticide provided with a substantially conical, foraminous bottom extending upwardly thereinto from its side walls; and a container in the receptacle having a portion thereof extending through the foraminous bottom, said container having a coagulable insect attracting liquid therein, the portion of the container extending through said foraminous bottom having an opening therein of a size to permit formation of a globule of the attracting liquid on the exterior of the container without the liquid flowing therefrom, said opening being in the bottom of the container whereby the globule is pendulous.

3. An insect attractor and destroyer comprising in combination, a receptacle for powdered insecticide provided with a substantially conical, foraminous bottom extending upwardly thereinto from its side walls; and a container in the receptacle having a portion thereof extending through the foraminous bottom, said container having a coagulable insect attracting liquid therein, the portion of the container extending through said foraminous bottom having an opening therein of a size to permit formation of a globule of the attracting liquid on the exterior of the container without the liquid flowing therefrom, said opening being in the bottom of the container whereby the globule is pendulous, said container bottom being concave with the opening at the innermost point thereof whereby the pendulous globule is circumscribed by a part of the container.

4. An insect attractor and destroyer comprising in combination, a receptacle for powdered insecticide provided with a substantially conical, foraminous bottom extending upwardly thereinto from its side walls; a container in the receptacle having a portion thereof extending through the foraminous bottom said container having a coagulable insect attracting liquid therein, the portion of the container extending through said foraminous bottom having an opening therein of a size to permit formation of a globule of the attracting liquid on the exterior of the container without the liquid flowing therefrom; and an electrode suspended within the liquid of the container, said electrode having a conductor extending to a source of current, said foraminous bottom being formed of conducting material and having means for connecting the same in circuit with the said electrode, said container being of non-conducting substance.

5. An insect attractor and destroyer comprising in combination, a receptacle having a substantially cylindrical side wall provided with legs for holding the same above a supporting surface and with a substantially conical foraminous bottom of electrically conducting material extending inwardly from the lower edge of the side wall and having a hole at the apex thereof; a container formed of non-conducting material disposed within the cylindrical receptacle and having its lower end projecting through the hole in the bottom, said container being provided with a concave bottom having an opening at the innermost point thereof of a size to permit formation of a globule of the attracting liquid on the exterior of the container without the liquid flowing therefrom; coagulable liquid in the container whereby the globule may have a relatively firm film and be maintained on the bottom of the container; an electrode immersed in the liquid in the container; and conductors joining the electrode and said foraminous bottom of conducting material in circuit with a source of current, said globule being within reach of the insect as it is perched upon the foraminous bottom.

MILO F. MILLER.